United States Patent

Hofstätter

(10) Patent No.: US 9,845,425 B2
(45) Date of Patent: Dec. 19, 2017

(54) GROUND SUPPORTING ENERGY RECOVERY MEDIUM WITH CARBOHYDRATE-BASED THICKENER, SALT AND PROPPANT IN BASE LIQUID

(71) Applicant: Montanuniversität Leoben, Leoben (AT)

(72) Inventor: Herbert Hofstätter, Voecklabruck (AT)

(73) Assignee: Montanuniversaität Leoben, Leoben (AT)

( * ) Notice: Subject to any disclaimer, the term of this patent is extended or adjusted under 35 U.S.C. 154(b) by 0 days.

(21) Appl. No.: 15/022,913

(22) PCT Filed: Sep. 18, 2014

(86) PCT No.: PCT/EP2014/069944
§ 371 (c)(1),
(2) Date: Mar. 17, 2016

(87) PCT Pub. No.: WO2015/040137
PCT Pub. Date: Mar. 26, 2015

(65) Prior Publication Data
US 2016/0230081 A1     Aug. 11, 2016

(30) Foreign Application Priority Data

Sep. 18, 2013   (GB) .................. 1316610.3

(51) Int. Cl.
*E21B 43/26* (2006.01)
*C09K 8/68* (2006.01)
(Continued)

(52) U.S. Cl.
CPC ................ *C09K 8/68* (2013.01); *C09K 8/665* (2013.01); *C09K 8/80* (2013.01); *C09K 8/90* (2013.01); *E21B 43/26* (2013.01); *E21B 43/267* (2013.01)

(58) Field of Classification Search
CPC ......... E21B 43/26; E21B 43/267; C09K 8/68; C09K 8/665; C09K 8/80; C09K 8/90
(Continued)

(56) References Cited

U.S. PATENT DOCUMENTS 3,634,237 A     1/1972   Crenshaw et al.
5,531,274 A *   7/1996   Bienvenu, Jr. ........... C09K 8/62
                                                    166/280.2

(Continued)

FOREIGN PATENT DOCUMENTS

WO   WO2006010912 A1   2/2006
WO   WO2012061147 A1   5/2012

OTHER PUBLICATIONS

Houchin L.R. et al., Evaluation of Potassium Carbonate as a Non-Corrosive, Chloride-Free Completion Fluid, Society of Petroleum Engineers SPE 27392, XP56153127, Feb. 10, 1994, pp. 483-494.

(Continued)

*Primary Examiner* — Silvana Runyan
(74) *Attorney, Agent, or Firm* — Robert A. Blaha; Smith Tempel Blaha LLC

(57) ABSTRACT

Energy recovery medium for insertion into a ground hole in a ground comprising a recoverable energy carrying medium, wherein the energy recovery medium comprises a base liquid, a carbohydrate-based thickener mixed in the base liquid, a salt dissolved in the base liquid and configured for increasing a density of the base liquid, and proppant particles dispersed within the mixture of the base liquid, the thickener and the salt.

18 Claims, 4 Drawing Sheets

(51) Int. Cl.
*C09K 8/66* (2006.01)
*C09K 8/90* (2006.01)
*C09K 8/80* (2006.01)
*E21B 43/267* (2006.01)

(58) Field of Classification Search
USPC .................................................... 166/280.1
See application file for complete search history.

(56) References Cited

U.S. PATENT DOCUMENTS

| | | | |
|---|---|---|---|
| 5,575,335 A | 11/1996 | King | |
| 5,785,747 A | 7/1998 | Vollmer et al. | |
| 7,032,667 B2 * | 4/2006 | Nguyen | C09K 8/805 166/280.2 |
| 7,032,671 B2 * | 4/2006 | Aud | E21B 43/26 166/250.1 |
| 2003/0102128 A1 | 6/2003 | Dawson et al. | |
| 2004/0182576 A1 * | 9/2004 | Reddy | C09K 8/12 166/295 |
| 2004/0206497 A1 | 10/2004 | Gonzalez | |
| 2004/0206498 A1 | 10/2004 | Phillippi et al. | |
| 2005/0003965 A1 | 1/2005 | Xiao et al. | |
| 2008/0277115 A1 | 11/2008 | Rediger et al. | |
| 2009/0008095 A1 | 1/2009 | Duncum et al. | |
| 2010/0093565 A1 | 4/2010 | Phatak et al. | |
| 2011/0240297 A1 | 10/2011 | Lord et al. | |
| 2011/0284225 A1 | 11/2011 | Lord et al. | |
| 2012/0231980 A1 | 9/2012 | Zhang et al. | |
| 2015/0000910 A1 * | 1/2015 | Russell | E21B 43/267 166/280.1 |

OTHER PUBLICATIONS

Dachary J. et al., Slim Hole Drilling Proven in Remote Exploration Project, Oil and Gas Journal, Jun. 22, 1992, pp. 62-67, vol. 90, No. 25, Tulsa, OK, US.

* cited by examiner

GROUND SUPPORTING ENERGY RECOVERY MEDIUM WITH CARBOHYDRATE-BASED THICKENER, SALT AND PROPPANT IN BASE LIQUID

TECHNICAL FIELD

The invention relates to an energy recovery medium, a method of producing an energy recovery medium, a method of recovering an energy carrying medium from a ground, an arrangement for recovering an energy carrying medium from a ground, and a method of use.

BACKGROUND

Hydraulic fracturing is a process that results in the creation of artificial fractures in rocks. An important industrial use of hydraulic fracturing is stimulating oil and gas wells. The fracturing is done from a bore hole (wellbore) drilled into reservoir rock formations to enhance oil and natural gas recovery. Hydraulic fractures may be natural or man-made and are extended by internal fluid pressure which opens the fracture and causes it to grow into the rock. Man-made fluid-driven fractures are formed at depth in a bore hole and extend into targeted rock formations. The fracture width is typically maintained after the injection by introducing a supporting material (proppant) into the injected fluid. Proppants prevent the fractures from closing when the injection is stopped. The technique of hydraulic fracturing is used to increase or restore the rate at which fluids, such as oil, gas or water, can be produced from a conventional sandstone reservoir, including reservoirs such as shale rock or coal beds or even tight gas reservoirs (e.g. Limestone, dolomite etc.). Conventionally used fracturing fluid is formed of suspended particles in a carrier fluid and is used to hold fractures open after a hydraulic fracturing treatment, thus producing a conductive pathway that fluids can properly flow along.

However, conventional fracturing material has been criticized in view of its potentially negative impact on the environment. Previous attempts to provide a biocompatible fracturing fluid have failed since it has not been possible to successfully produce biocompatible fracturing fluids having a sufficient stability, so that the economic efficiency of such conventional concepts has not been sufficient.

SUMMARY

There may be a need to provide a medium which functionally substitutes conventional fracturing material and shows a long-term stability without having any negative impact on the environment.

According to exemplary embodiments of the invention, an energy recovery medium, a method of producing an energy recovery medium, a method of recovering an energy carrying medium from a ground, an arrangement for recovering an energy carrying medium from a ground, and a method of use according to the independent claims are provided.

According to an exemplary embodiment of the invention, an energy recovery medium (in particular a bioenhanced energy recovery medium) for insertion into a ground hole in a ground is provided which ground comprises a recoverable energy carrying medium, wherein the energy recovery medium comprises a base liquid, a carbohydrate-based thickener (in particular an organic thickener) mixed in the base liquid, a salt dissolved in the base liquid and configured for increasing a density of the base liquid, and proppant particles floating (rather than settling to the bottom of the energy recovery medium, i.e. not sedimenting) within the mixture of the base liquid, the thickener and the salt (which is preferably also acting as a corrosion inhibitor).

According to another exemplary embodiment, a method of producing an energy recovery medium for insertion into a ground hole in a ground comprising a recoverable energy carrying medium is provided, wherein the method comprises mixing a carbohydrate-based thickener with a base liquid, dissolving a salt in the base liquid, wherein the salt is configured for increasing a density of the base liquid (in particular the salt may have a density being larger than a density of the base liquid), and adding proppant particles so that the proppant particles float (particularly are distributed homogeneously over the entire volume of the energy recovery medium) within the mixture of the base liquid, the thickener and the salt.

According to a further exemplary embodiment, a method of recovering an energy carrying medium from a ground is provided, wherein the method comprises forming a ground hole (which may comprise one or more a vertical ground hole sections and/or one or more horizontal ground holes sections, wherein different sections may be interconnected to one another and wherein slanted ground hole sections are possible as well) in the ground, inserting energy recovery medium having the above mentioned features into at least a part of the ground hole for interaction with the ground (such an interaction may comprise for instance forming further ground hole sections, widening ground hole sections and/or mechanically supporting or stabilizing sections of the ground hole), removing at least part of the energy recovery medium from the ground after the interaction with the ground (wherein a part of the energy recovery media may remain within the ground hole, in particular at least part of the proppant particles), and transporting the energy carrying medium from the ground, in particular via channels (or ground hole sections) at least partially delimited by proppant particles of the energy recovery medium, out of the ground hole.

According to yet another embodiment, an arrangement for recovering an energy carrying medium from a ground is provided, wherein the arrangement comprises a ground hole formation unit (such as bore equipment) configured for forming a ground hole in the ground, an energy recovery medium having the above mentioned features for insertion into at least a part of the formed ground hole for temporary interaction with the ground, and a transport unit (such as a pump) for transporting the energy carrying medium from the ground, in particular via channels at least partially delimited by proppant particles of the energy recovery medium, out of the ground hole.

According to yet another embodiment, an energy recovery medium having the above mentioned features or an arrangement having the above mentioned features is used for recovering at least one of the group consisting of oil (such as mineral and), gas (such as petroleum gas), and hot water (particularly for geothermic applications) from a ground. The method is also applicable for enhanced injectivity.

The term "energy recovery medium" may particularly denote a proppant-based material which can be used for holding fractures of a bore hole open, for instance during pumping energy carrying medium out of the bore hole. The energy recovery medium may have fluidic properties. For instance, the energy recovery medium may have solution like properties (in view of the dissolution of the salt in the base liquid) and may at the same time have suspension like properties (in view of the mixing of the carbohydrate-based thickener and the proppant particles with the base liquid). Such an energy recovering medium can be pumped or squeezed into a deep bore hole and in order to form, widen and/or stabilize cracks or fractures in the ground. By taking this measure, the fluid (i.e. gas and/or liquid) permeability of the ground is increased so that energy carrying fluids such as petroleum gas, mineral oil and/or hot water may flow easier towards the bore hole to be recovered by pumping it out of the bore hole. By such a technology, it is possible to recover (or make accessible) even small rest amounts of fluidic fossil energy carrying raw material, which is more difficult to recover in view of the relatively small permeability of the ground material.

The term "recoverable energy carrying medium" may particularly denote a material in the ground which intrinsically carries energy which can be recovered by a corresponding energy recovery processing. For instance, the carried energy may be thermal energy, as in case of hot water, in terms of a geothermic recovery system. The carried energy may however be also energy which can be recovered by carrying out a corresponding physical or chemical reaction, as in case of crude oil or petroleum gas. The recoverable energy carrying medium may be a fluidic medium such as a liquid and/or a gas, optionally with additional solid particles therein.

The term "base liquid" may particularly denote a liquid component of the energy recovery medium to which the other solid components may be added to render them flowable.

The term "carbohydrate-based thickener" may particularly denote a thickening agent which is formed on the basis of a carbohydrate material. A carbohydrate may be denoted as an organic compound (which may be manufactured naturally or technically) comprising (in particular only) carbon, hydrogen, and oxygen.

The term "salt" may particularly denote a chemical constituted by a cation (i.e. a positively charged ion) and an anion (i.e. a negatively charged ion). Exemplary embodiments use a and is salt which can be dissolved in an appropriate base liquid such as water.

The term "proppant particles" may particularly denote solid particles, for instance in the form of a granulate (which may be insoluble in the base liquid), which can be used in the energy recovery medium for providing a supporting function within the ground hole formed in the ground. The presence of the proppant particles may prevent the ground hole, connected fractures and channels and/or narrow gaps within the ground hole from being closed by the pressure of the ground material. Thus, the presence of proppant particles in the described channels may promote the permeability of the energy carrying medium to be recovered.

The term "floating" may particularly denote that at least a majority (i.e. at least 50%, particularly at least 80%, more particularly at least 90%) of the proppant particles is prevented from sedimenting, i.e. accumulating on the ground of a container containing the energy recovery medium. In contrast to this, the floating proppant particles may be distributed homogeneously over the energy recovery medium over a long-term. Thus, stirring or shaking the energy recovery medium directly before use (to re-lift sedimented proppant particles) is usually dispensable.

The term "bore hole" or wellbore may particularly denote a vertical, horizontal or slanted hole drilled in a formation such as a rock to access deeper regions of the formation in which exploitation fluids such as oil, gas or water may be located.

The term "fracture" may particularly denote a void in a formation forming an extension of a bore hole. After such a fracture has been formed for instance by applying a hydraulic pressure, it can be prevented from closing again by the use of the energy recovery medium, thereby forming the basis for subsequently recovering energy comprising medium from the ground.

According to an exemplary embodiment of the invention, a highly efficient energy recovery medium is provided for maintaining fractures or other channels in the ground open for simplifying recovery of energy carrying medium from a ground hole and having excellent long-term properties in terms of storability in a container or the like. At the same time, the energy recovery medium may be constituted exclusively by components which are all completely biocompatible and do not harm at all the environment. Hence, a bioenhenced energy recovery system can be provided by exemplary embodiments. The carbohydrate-based thickener, being obtainable or producible from natural components and being properly mixable with biocompatible base liquids such as water, has the effect that the viscosity of the energy recovery medium is increased, thereby suppressing undesired sedimentation of proppant particles even at small amounts of carbohydrate-based thickeners. Also the carbohydrate-based thickener itself is not prone to sedimenting within the energy recovery medium. The salt can be made from a natural material as well and can be dissolved in a biocompatible base liquid such as water. By using a salt having a higher density than the base liquid, it is possible that the density of the overall energy recovery medium is significantly increased which also contributes to the suppression of undesired sedimentation of the relatively heavy proppant particles by applying sort of lifting force. Due to this highly advantageous effect, it may be dispensable to stir the energy recovery medium before use. This results in a significant simplification of the energy carrying medium recovery process since large amounts of energy recovery medium need to be pumped in the ground hole on the industrial scale. Pre-processing of these large amounts directly before use to restore the homogeneity of the energy recovery medium is therefore dispensable according to exemplary embodiments. The proppant particles have the function to maintain fractures in the ground open after having pumped the energy recovery medium into the bore hole. Thus, the channels may be maintained open by the proppant particles. It has furthermore turned out that the described energy recovery medium has advantageous properties in terms of injectivity. This means that after having introduced the energy recovery medium into the ground, and after having removed the energy carrying medium out of the ground, this energy carrying medium still comprises impurities such as other fluids, for instance water and/or components of the energy recovery medium. These impurities can then be pumped back into the ground. During this injection procedure, the portion of the energy recovery medium remaining within the ground contributes to the capability of the ground to receive this fluid, i.e. injectivity.

In the following, further exemplary embodiments of the energy recovery medium, the method of producing an energy recovery medium, the method of recovering an energy carrying medium from a ground, the arrangement for recovering an energy carrying medium from a ground, and the method of use will be described.

In an embodiment, the carbohydrate-based thickener comprises or consists of starch. The term "starch" may particularly denote a powder like solid which may be produced from many plants such as potatoes, wheat, corn, and wood. Starch may be denoted as a carbohydrate consisting of a large number of glucose units joined by glycosidic bonds. It can be considered as a polysaccharide which is produced by green plants as an energy store. In an embodiment, the starch is selected from a group consisting of corn starch, potato starch and wood starch. These materials can all be produced from plants so that also this ingredient of the energy recovery medium is completely biocompatible. Alternatively, it is also possible to manufacture the starch artificially without losing its function or biocompatibility. It is possible that the starch is modified physically and/or chemically to adjust its physical and/or chemical properties in accordance with a specific application, for instance to adjust or modify its rheological properties and/or its swelling capacity in the base liquid.

Additionally or alternatively, the carbohydrate-based thickener may comprise or may consist of gum, in particular xanthan gum. Xanthan gum is a polysaccharide secreted by the bacterium *Xanthomonas campestris*, but can also be manufactured technically/artificially. It is composed of five sugars, glucose, mannose, and glucuronic acid. It can be produced by the fermentation of glucose, sucrose, or lactose. After a fermentation period, the polysaccharide may be precipitated from a growth medium with isopropyl alcohol, dried, and ground into a fine powder. However, other kinds of gum may be used as well, such as gum arabic or guar gum.

In an embodiment, the base liquid comprises or consists of water. Thus, pure water being available in large amounts and being completely biocompatible can be used for the energy recovery medium. However, alternatively other basic liquids may be implemented such as biocompatible organic solvents.

In an embodiment, the water is selected from a group consisting of fresh, brackish or even sea water, and deposit or saline water from aquifers. Fresh water, for instance tap water, is cheap and available even in large quantities. Deposit water or field water, for instance directly from the ground hole formed for recovery of the energy carrying medium, is available directly at the location where the energy recovery medium is employed. Hence, the use of deposit or field water is highly efficiently and does not deteriorate the properties of the energy recovery medium.

In an embodiment, the salt is an alkali metal salt (i.e. a salt of an alkali metal). This kind of salts has turned out to be properly soluble in many base liquids in sufficiently large amounts. Alkali metal ions also form salts with relatively heavy chemical groups such as carbonate which allows to efficiently increase the density of the energy recovery medium, thereby applying a lifting force or buoyancy force on the relatively heavy proppant particles to prevent them from sedimenting.

In another embodiment, the salt is an earth alkali metal salt (i.e. a salt of an earth alkali metal).

In a preferred embodiment, the salt is potassium carbonate. Potassium carbonate ($K_2CO_3$) is a white salt, soluble in water, which forms a strongly alkaline solution. Depending on the genesis there might be some impurities of other salts as well. It can be made as the product of potassium hydroxide's absorbent reaction with carbon dioxide. Potassium carbonate has turned out as an ideal component of the energy recovery medium. On the one hand, it has a high density and is soluble in water in high amounts, so that the sedimentation inhibiting effect is particularly strong. On the other hand, potassium carbonate has strong corrosion inhibiting properties which is of high value for use as an energy recovery medium in a deep ground hole. Potassium carbonate has turned out as a particularly appropriate choice for the salt. Primarily, it functions in the energy recovery medium as a weighting agent. It is excellently soluble in water and functions as a corrosion inhibitor. Beyond this, it is absolutely biocompatible (for instance, it can be used in agricultural industry as a fertilizer). It also serves for stabilizing tone (and particularly inhibits moisture expansion). Potassium carbonate is furthermore thermally stable and is therefore employable over a broad temperature range. Moreover, potassium carbonate can also be used for controlling the pH value of the energy recovery medium.

In an embodiment, the proppant particles are selected from a group consisting of bauxite and sand. Such proppant particles are on the one hand biocompatible, on the other hand available cheap and in huge amounts, and also efficiently maintain open fractures in the ground hole even in the presence of a high pressure.

In an embodiment, at least approximately 50% of the proppant particles, in particular at least approximately 90% of the proppant particles, have a dimension in a range between approximately 0.5 mm and approximately 3 mm. In this dimension, the floating properties of the proppant particles in the described mixture constituting the energy recovery medium are very good. Moreover, this maintains a proper flowability of the energy recovery medium as a whole. At the same time, such proppant particles may efficiently keep open fractures in the ground hole.

In an embodiment, a ratio between a mass of the carbohydrate-based thickener and a volume of the base liquid is in a range between approximately 0.1 g/l and approximately 5 g/l, in particular in a range between approximately 0.3 g/l and approximately 1 g/l. Thus, the thickener can fulfil its function already in very small amounts.

A ratio between a mass of the salt and a volume of the base liquid may be in a range between approximately 500 g/l and approximately 1500 g/l, in particular in a range between approximately 700 g/l and approximately 1000 g/l. Therefore, the buoyancy force of the heavy salt lifting the proppant particles can be rendered very strong, when such large amounts of salt can be dissolved in the base liquid.

A ratio between a mass of the proppant particles and a volume of the base liquid may be in a range between approximately 500 g/l and approximately 3000 g/l, in particular in a range between approximately 1000 g/l and approximately 2000 g/l. Thus, the ground stabilization function of the proppant particles may be rendered very strong, since the described large amounts of proppant particles can be mixed within the energy recovery medium without sedimentation.

Particularly the combination of described mass-volume ratios results in a highly efficient energy recovery medium.

In a particularly preferred embodiment, the energy recovery medium comprises 0.5 (±20%) gram carbohydrate-based thickener (for instance natural or modified starch or xanthan gum) per liter base liquid (for instance water), 850 (±20%) gram salt (for instance potassium carbonate) per liter base liquid (for instance water), and 1500 (±20%) gram proppant particles (for instance with a grain size distribution of 16/20) per liter base liquid (for instance water). Citric acid may be optionally added in an appropriate amount for pH adjustment.

In an embodiment, the energy recovery medium consists exclusively of the base liquid (in particular water), the carbohydrate-based thickener (in particular xanthan gum), the salt (in particular potassium carbonate) and the proppant particles (in particular sand). Thus, in such embodiments, the energy recovery medium can be mixed of only four components and therefore in a very simple and fast way. Nevertheless, this four component system meets all requirements and boundary conditions for the described energy recovery medium for ground hole. The carrying fluid may be biodegraded or broken by the ambient temperature in the reservoir after a certain period of time.

As an alternative to the previously described embodiments, the energy recovery medium may comprise at least one further additive added to the mixture of the base liquid, the carbohydrate-based thickener, the salt and the proppant particles. The term "additive" hereby relates to an additional component with a relatively low weight percentage, for instance less than 5%, particularly less than 1%, more particularly less than 0.1%. Examples for additives which may be used, if required or desired, is a gelling agent, a foam, a scale inhibitor, a friction reducer, a pH control agent, a surfactant, a cross-linker, a temperature stabilizer, etc. However, such additives are not absolutely necessary according to exemplary embodiments. For instance, such an additive may comprise a pH adjustment agent, in particular citric acid.

In an embodiment, the base liquid, the salt, the carbohydrate-based thickener and the proppant particles are biocompatible materials, particularly natural materials. Therefore, the energy recovery medium does not include any chemical which might be harmful for the environment.

In an embodiment, the proppant particles are configured as high pressure resistant support particles. Therefore, even when the energy recovering material is introduced in a very deep borehole with a depth of hundreds or thousands of meters, it can resist the high pressure there and can nevertheless keep fractures open for conveying energy carrying medium out of the borehole, even in the presence of several bars, several tens or even several hundred bars of ambient pressure.

In an embodiment, the salt is made of a corrosion inhibiting material. Therefore, undesired corrosion effects within the bore hole in the ground can be suppressed or even eliminated. One particularly suitable material for this task is potassium carbonate which synergetically has desirable properties in terms of generating a high lifting force acting on the proppant particles.

In an embodiment, the salt has a density being larger than a density of the proppant particles and/or of the carbohydrate-based thickener. By taking this measure, the suppression of the sedimentation of the proppant particles can be further enhanced.

In an embodiment, the carbohydrate-based thickener is mixed with the base liquid before the salt is dissolved in the base liquid. It has turned out that the mixing properties as well as the stability of the energy recovery medium, and particularly the tendency that the mixture demixes, disintegrates or decomposes into the individual components, can be surprisingly suppressed very efficiently by firstly mixing the carbohydrate-based thickener with the base liquid before dissolving the salt in the base liquid.

The above-described system may be used for oil production, water recovery and geothermic systems. Also gas pumping may be possible. Other applications are possible as well. The described completely biocompatible and even bioenhanced technology enables the production of natural gas and oil from rock formations deep below the earth's surface. At such depth, there may not be sufficient permeability to allow natural gas and oil to flow from the rock into the well bore and be recovered. For example, creating conductive fractures in the rock is essential to produce gas from reservoirs with extremely low permeability (e.g. shale reservoirs). The fractures (which may be formed, processed and/or supported by the energy recovery medium according to an exemplary embodiment) provides a conductive path connecting a larger area of the reservoir to the well, thereby increasing the area from which natural gas and liquids can be recovered from the targeted formation.

BRIEF DESCRIPTION OF THE DRAWINGS

The invention will be described in more detail hereinafter with reference to examples of embodiment but to which the invention is not limited.

DETAILED DESCRIPTION OF ILLUSTRATED EMBODIMENTS

Figure 1A:
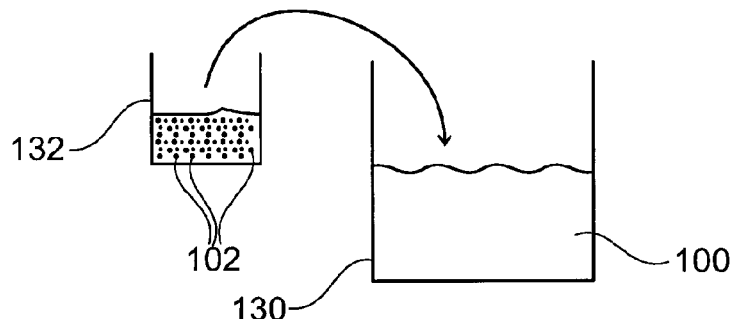
FIG. 1A to FIG. 1D schematically illustrate different procedures during carrying out a method of producing an energy recovery medium, shown in FIG. 1D, according to an exemplary embodiment of the invention.

The illustrations in the drawings are schematically. In different drawings similar or identical elements are provided with the same reference signs.

Figure 1B:
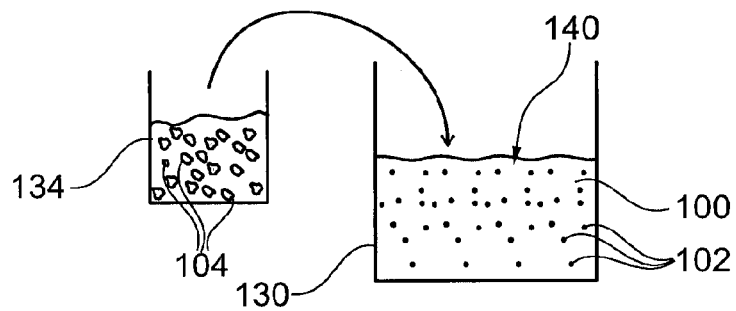
Figure 1C:
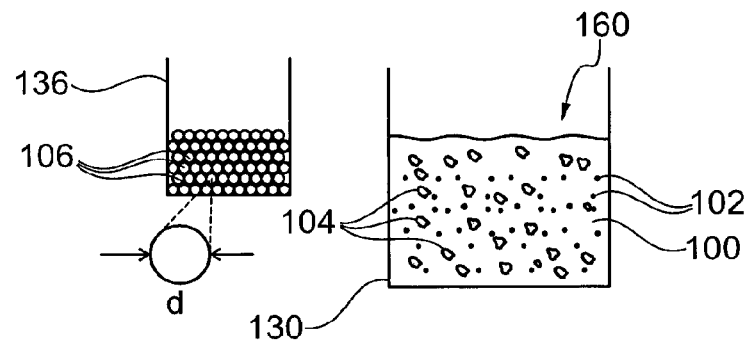
Figure 1D:
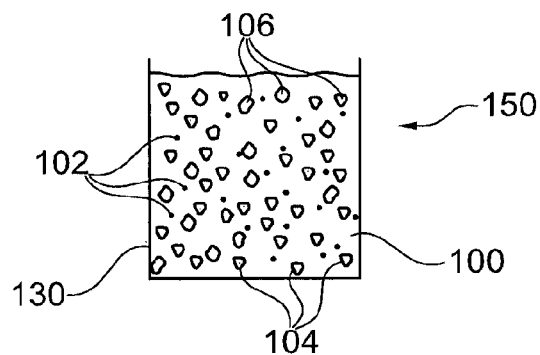

FIG. 1A to FIG. 1D schematically illustrate different procedures during carrying out a method of producing an energy recovery medium 150, shown in FIG. 1D, according to an exemplary embodiment of the invention.

FIG. 1A shows a container 130 with water as base liquid 100 to which a carbohydrate-based thickener 102, here embodied as xanthan gum, is added from another container 132 to increase the viscosity of the base liquid 100. The amount of the xanthan gum 102 is 0.5 g/l water and is therefore relatively small.

FIG. 1B shows a mixture 140 obtained from the procedure according to FIG. 1A and furthermore shows that a salt 104 from a further container 134 is then added to the mixture 140. In the present embodiment, the salt 104 is embodied as potassium carbonate. The amount of the salt 104 is 850 g/l water, but can be even more. Potassium carbonate dissolves in the mixture 140 of base liquid 100 and carbohydrate-based thickener 102. It has turned out that, surprisingly, the properties of the produced energy recovery material 150 in terms of long-term stability and suppression of undesired sedimentation or separation of the individual constituents of the energy recovery medium 150 to be prepared (compare FIG. 1D) can be significantly improved if the procedure of the dissolution of the salt 104 in the base liquid 100 is performed after mixing the base liquid 100 with the carbohydrate-based thickener 102. In other words, this procedural order promotes the stability of the resulting suspension/solution medium. Furthermore, this procedural order allows to form the energy recovery medium 150 with a very small amount of carbohydrate-based thickener 102 (for instance up to 50% less than in the inverse order).

FIG. 1C shows yet another container 136 with sand or bauxite or ceramic products as proppant particles 106 which is added to solution 160 of base liquid 100 and salt 104 mixed with the carbohydrate-based thickener 102 as obtained by the procedure described referring to FIG. 1B. The amount of the proppant particles 106 is 1500 g/l water (wherein the grain size distribution of the proppant particles 106 may be 16/20). As can be taken from FIG. 1C, an average size, d, of the proppant particles 106 may be in order of magnitude of 1 mm, wherein a certain size distribution is possible and usual. In use as a pressure-resistant stabilizing medium during energy carrying material recovery, the proppant particles 106 function as supporting material which maintains fractures in the ground continuously open and prevents them from closing again, to thereby promote flow of energy carrying medium through these fractures between proppant particles 106. In other words, the proppant particles 106 maintain the flow channels free and suppress re-closure of the fractures in the ground. The composition of base liquid 100, salt 104 and carbohydrate-based thickener 102 has turned out as a highly efficient carrying medium having a high carrying capacity concerning the proppant particles 106. Hence, a very high amount of proppant particles 106 can be carried in a stable manner by the composition of base liquid 100, salt 104 and carbohydrate-based thickener 102 without sedimenting.

If desired or required, the pH value of the resulting energy recovery medium 150 according to an exemplary embodiment shown in FIG. 1D may be adjusted by adding a corresponding pH adjustment agent such as citric acid.

The energy recovery medium 150 shown in FIG. 1D has physical and chemical properties which allow the proppant particles 106 to float within the mixture of base liquid 100, carbohydrate-based thickener 102 and salt 104. No sedimentation of proppant particles 106 occurs. Thus, the energy recovery medium 150 can be prepared once in a factory and does not have to be stirred or reconditioned before actual use. Even during use, no sedimentation occurs. Without wishing to be bound to a specific theory, it is presently believed that the high physical density of the salt 104 which dissolves in the base liquid 100 in large amounts provides a liquid matrix for the relatively heavy proppant particles 106 which consequently float without sedimentation. Surprisingly, the addition of already small amounts of a carbohydrate-based thickener 102 further improves these physical and chemical properties and additionally suppresses sedimentation or decomposition by rendering the mixture viscous or sticky. It should further be said that each and every component of the energy recovery medium 150 is fully biocompatible since all components are natural materials. Thus, when being implemented for recovering an energy carrying medium (such as oil, gas or hot water) from a bore hole in a natural ground, the energy recovery medium 150, and each individual component thereof, may remain within the ground without being harmful for the environment. Moreover, particularly the proppant particles 106 are high pressure resistant, i.e. withstand high pressure values as being present within the bore hole in the ground of a depth of several hundreds or even several thousand meters. Simultaneously, the procedure of preparing the energy recovery medium 150 is very simple and involves only cheap components being available in high quantities.

FIG. 2A to FIG. 2D schematically illustrate different procedures during carrying out a method of recovering an energy carrying medium 270 (shown only schematically) from a ground 202 according to an exemplary embodiment of the invention. To carry out this procedure, an arrangement for recovering the energy carrying medium 270 from the ground 202 is implemented having components being shown in FIG. 2A to FIG. 2D as well.

Figure 2A:
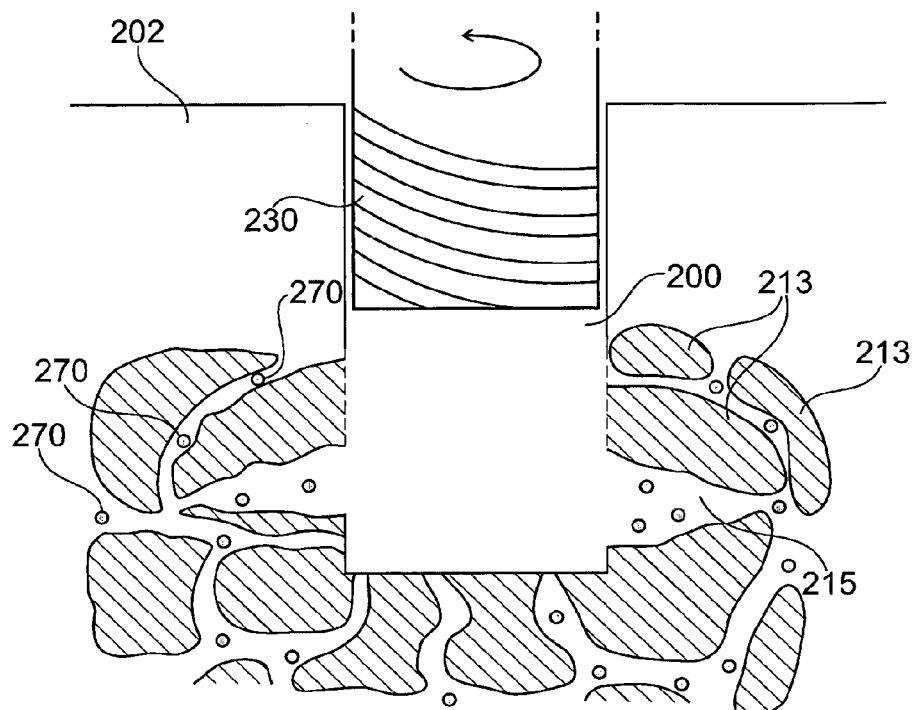
FIG. 2A to FIG. 2D schematically illustrate different procedures during carrying out a method of recovering an energy carrying medium from a ground according to an exemplary embodiment of the invention.

As can be taken from FIG. 2A, a ground hole formation unit 230 (only shown schematically), here embodied as a bore head, forms a ground hole 200 in the ground 202. The ground 202 consists of rocks 213, sand, etc., between which fractures or gaps 215 are formed (naturally and/or man-made). Within the gaps 215, energy carrying material 270, such as oil or gas, is present. In the described embodiment the mentioned arrangement is operated for recovering this energy carrying material 270 at least partially from the ground 202. The energy carrying material 270 may be in the form of cells or cavities of oil or gas, or may be even distributed equally or homogeneously with a relatively low concentration within rock material, sand, etc., of the ground 202.

Figure 2B:
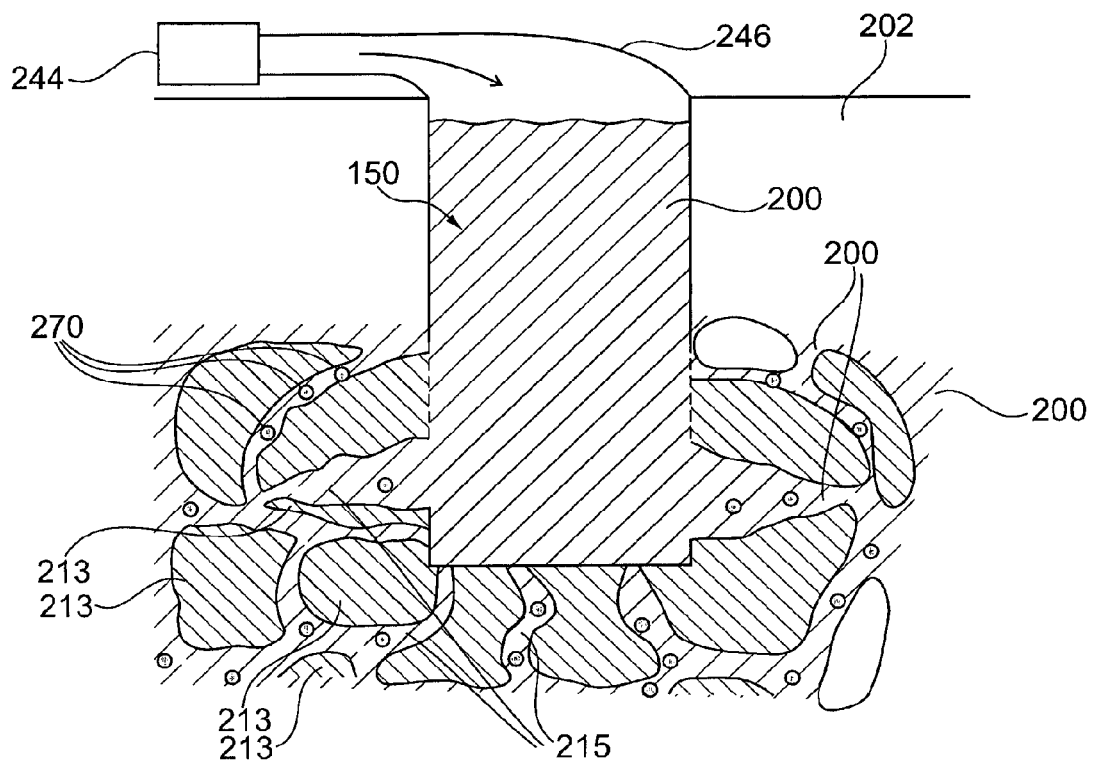

As can be taken from FIG. 2B, energy recovery medium 150 according to an exemplary embodiment (for instance the one manufactured according to FIG. 1A to FIG. 1D) is inserted into the formed ground hole 200 and also flows into the fractures or gaps 215 for temporary interaction with the ground 202. During this interaction, additional fractures or gaps 215 may be formed, existing ones may be widened and/or may be stabilized against undesired reclosure. For this insertion, a pump 244 connected with a reservoir (not shown) of energy recovery medium 150 is connected with the ground hole 200 via a tube or hose 246 so that the pump 244 can convey the energy recovery medium 150 into the ground hole 200 and from there also into the gaps 215. It should be said that also the energy recovery medium 150 is shown only schematically in FIG. 2B and is constituted by base liquid 100, carbohydrate-based thickener 102, salt 104 and proppant particles 106.

Figure 2C:
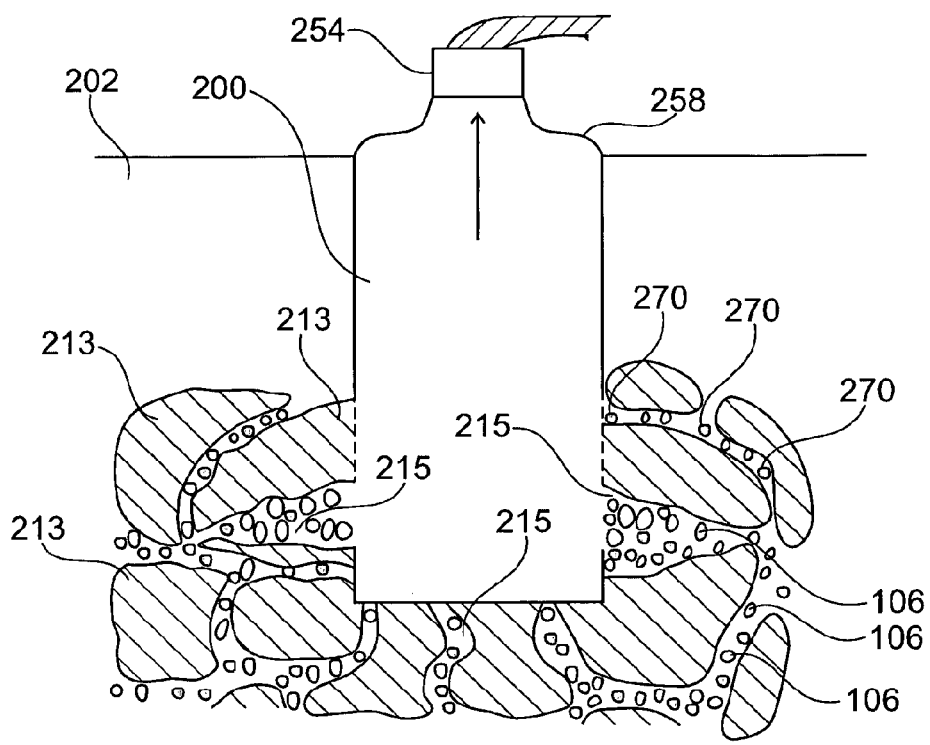

As can be taken from FIG. 2C, a part of the energy recovery medium 150 pump into the ground hole 200 and into the gaps 215 is then removed to a location outside of the ground 202. In other words, part of the energy recovery medium 150 is transported out of the ground 202 after the interaction with the ground 202. For this purpose, a suction pump 254 is connected via a tube or hose 258 with the ground hole 200 and sucks at least part of the base liquid 100, the carbohydrate-based thickener 102 and the salt 104 out of the ground 202. However, at least part of the proppant particles 106 remain in the gaps 215 and stabilize them against undesired re-closure due to the weight force and the high pressure within the gaps 215 deep below the surface level. The proppant particles 106 therefore serve as high pressure resistant stabilizing material and maintain the fractures open to simplify access to the energy carrying medium 270.

Figure 2D:
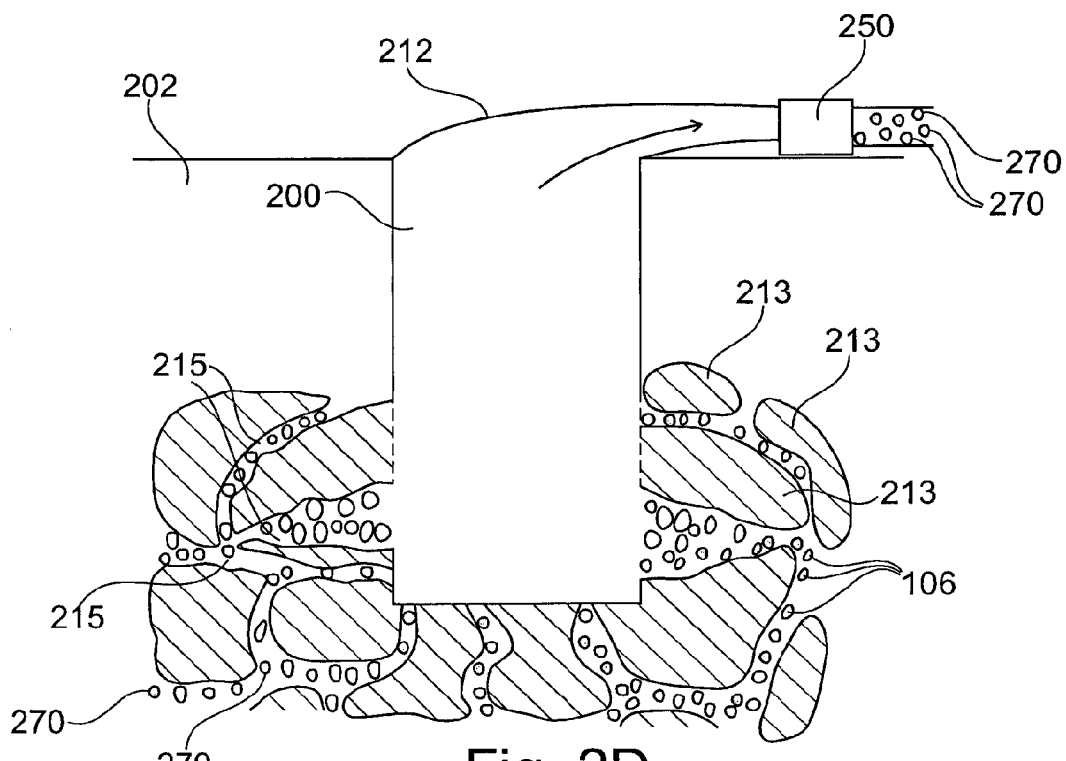

As can be taken from FIG. 2D, the stabilizing function of the proppant particles 106 as an inhibitor for preventing the gaps 215 to close is then used for transporting the energy carrying medium 270 out of the ground hole 202 via channels delimited also by the proppant particles 106 of the energy recovery medium 150. For this purpose, a transport unit 250, 212 is employed for transporting the energy carrying medium 270 from the ground 202 out of the ground hole 200. The transport unit 250, 212 is formed by a suction pump 250 in combination with a tube or hose 212 connecting the ground hole 200 with the suction pump 250. Via the suction pump 250, the energy carrying medium 270 is pumped into a reservoir (not shown) for further processing or use of the carried energy.

Figure 3:
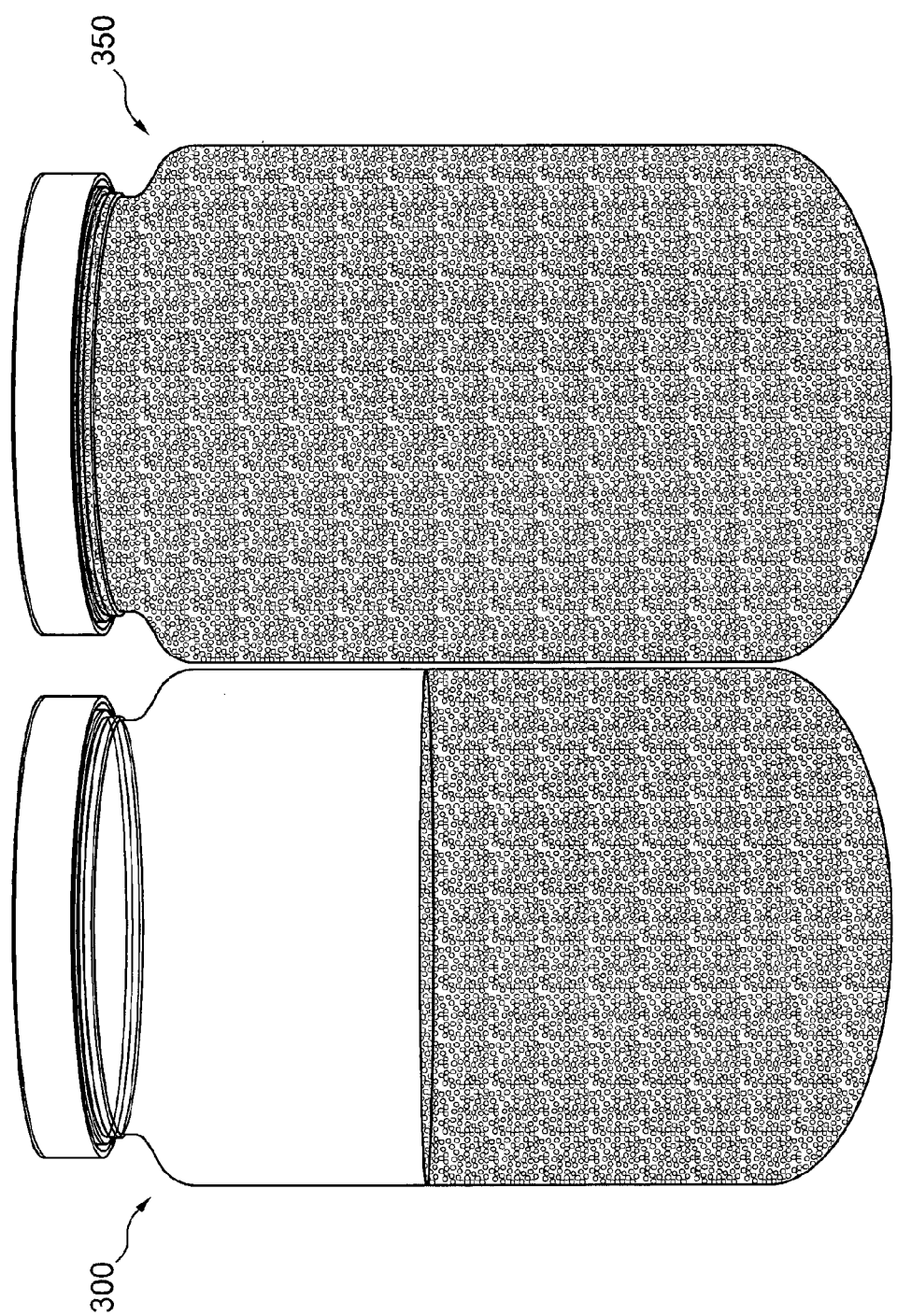
FIG. 3 shows, on the left-hand side, an image of a conventionally used substance of a base liquid, a standard polymer and proppant particles sedimenting on the ground, and shows, on the right-hand side, an image of an energy recovery medium according to an exemplary embodiment and being made of a base liquid, a carbohydrate-based thickener, a salt and proppant particles which freely float without sedimenting on the ground.

FIG. 3 shows, compare reference numeral 300, an image of a container containing a conventionally used substance of a base liquid, a standard polymer and proppant particles. As can be taken from FIG. 3, the proppant particles accumulate and sediment on the ground so that the substance has to be stirred intensively before being usable.

FIG. 3 furthermore shows, compare reference numeral 350, an image of another container containing an energy recovery medium according to an exemplary embodiment and being composed of water as a base liquid, xanthan gum as a carbohydrate-based substance, potassium carbonate as a salt and proppant particles which freely float without sedimenting on the ground. Thus, the substance shown in FIG. 3 has very homogeneous properties and can be directly used for recovering an energy carrying medium without reconditioning such as stirring or the like. Furthermore, the substance is composed exclusively of absolutely biocompatible material so that it is not harmful at all for the environment.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. In a device claim enumerating several features, several of these features may be embodied by one and the same item of software or hardware. The mere fact that certain measures are recited in mutually different dependent claims does not indicate that a combination of these measures cannot be used to advantage.

The invention claimed is:

1. Energy recovery medium for insertion into a ground hole in a ground comprising a recoverable energy carrying medium, wherein the energy recovery medium comprises:
   a base liquid;
   a carbohydrate-based thickener mixed in the base liquid forming a first mixture;
   a salt dissolved in the first mixture forming a second mixture, wherein the salt is configured for increasing a density of the base liquid, and wherein the salt comprises potassium carbonate; and
   proppant particles dispersed within the second mixture of the base liquid, the carbohydrate-based thickener and the salt,
   wherein a ratio between a mass of the salt and a volume of the base liquid is in a range between 500 g/l and 1500 g/l.

2. The energy recovery medium of claim 1, wherein the carbohydrate-based thickener consists of a starch selected from a group consisting of corn starch, potato starch and wood starch.

3. The energy recovery medium of claim 1, wherein the carbohydrate-based thickener comprises xanthan gum.

4. The energy recovery medium of claim 1, wherein the base liquid comprises water.

5. The energy recovery medium of claim 4, wherein the water is selected from a group consisting of fresh water, and deposit or field water.

6. The energy recovery medium of claim 1, wherein the salt comprises an alkali metal salt.

7. The energy recovery medium of claim 1, wherein the proppant particles are selected from a group consisting of bauxite and sand.

8. The energy recovery medium of claim 1, wherein at least 50% of the proppant particles have a dimension in a range between 0.5 mm and 3 mm.

9. The energy recovery medium of claim 1, wherein a ratio between a mass of the carbohydrate-based thickener and a volume of the base liquid is in a range between 0.1 g/l and 5 g/l.

10. The energy recovery medium according to claim 1, wherein a ratio between a mass of the proppant particles and a volume of the base liquid is in a range between 500 g/l and 3000 g/l.

11. The energy recovery medium according to claim 1, consisting of the base liquid, the carbohydrate-based thickener, the salt and the proppant particles.

12. The energy recovery medium according to claim 1, additionally comprising at least one additive.

13. The energy recovery medium of claim 1, comprising at least one of the following features:
   the base liquid, the carbohydrate-based thickener, the salt and the proppant particles are biocompatible materials;
   the proppant particles are pressure resistant support particles; and
   the salt is made of a corrosion inhibiting material and has a density being larger than a density of the proppant particles and/or of the carbohydrate-based thickener.

14. A method of producing an energy recovery medium for insertion into a ground hole comprising a recoverable energy carrying medium, wherein the method comprises:
   mixing a carbohydrate-based thickener with a base liquid forming a first mixture;
   dissolving a salt in the first mixture forming a second mixture, wherein the salt is configured for increasing a density of the base liquid, and wherein the salt comprises potassium carbonate; and
   adding proppant particles so that the proppant particles float within the second mixture of the base liquid, the carbohydrate-based thickener and the salt,
   wherein a ratio between a mass of the salt and a volume of the base liquid is in a range between 500 g/l and 1500 g/l.

15. The method of claim 14, wherein the carbohydrate-based thickener is mixed with the base liquid forming the first mixture before the salt is dissolved in the base liquid being already mixed with the carbohydrate-based thickener forming the second mixture.

16. A method of recovering an energy carrying medium, wherein the method comprises:
   forming a ground hole;
   inserting an energy recovery medium into at least a part of the ground hole for interaction with the ground, the energy recovery medium including,
   a base liquid;
   a carbohydrate-based thickener mixed in the base liquid forming a first mixture;
   a salt dissolved in the first mixture forming a second mixture, wherein the salt increases a density of the base liquid, the salt comprising potassium carbonate; and
   proppant particles dispersed within the second mixture of the base liquid, the carbohydrate-based thickener and the salt,
   wherein a ratio between a mass of the salt and a volume of the base liquid is in a range between 500 g/l and 1500 g/l;
   removing part of the energy recovery medium from the ground after the interaction with the ground; and subsequently transporting the energy carrying medium from the ground via channels at least partially delimited by proppant particles of the energy recovery medium, out of the ground hole.

17. An arrangement for recovering an energy carrying medium from a ground, wherein the arrangement comprises:
a ground hole formation unit configured for forming a ground hole;
an energy recovery medium for insertion into at least a part of the formed ground hole for interaction with the ground, the energy recovery medium including,
a base liquid;
a carbohydrate-based thickener mixed in the base liquid forming a first mixture;
a salt dissolved in the first mixture forming a second mixture, wherein the salt increases a density of the base liquid, the salt comprising potassium carbonate; and
proppant particles dispersed within the second mixture of the base liquid, the carbohydrate-based thickener and the salt,
wherein a ratio between a mass of the salt and a volume of the base liquid is in a range between 500 g/l and 1500 g/l; and
a transport unit for transporting the energy carrying medium from the ground via channels at least partially delimited by proppant particles of the energy recovery medium, out of the ground hole.

18. The arrangement of claim 17, wherein at least one of a group consisting of oil, gas, and hot water are recovered from the ground.

* * * * *